Aug. 13, 1968
G. JÄCKERING
3,396,913
MEANS FOR COMMINUTING THERMOPLASTIC MATERIALS
Original Filed Aug. 6, 1963
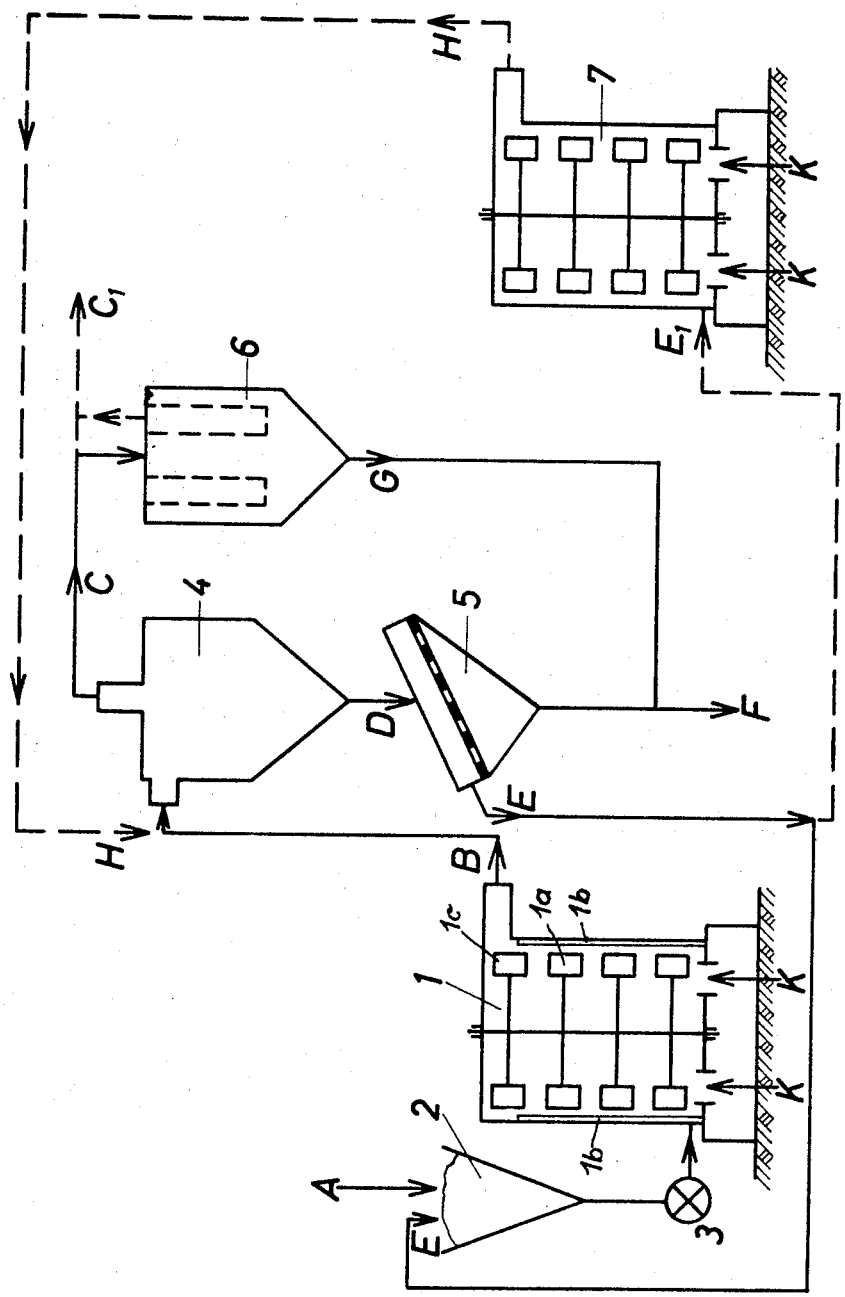
INVENTOR
G. Jäckering
BY
Richards & Geier
ATTORNEYS

United States Patent Office 3,396,913
Patented Aug. 13, 1968

3,396,913
MEANS FOR COMMINUTING THERMOPLASTIC MATERIALS
Gunter Jäckering, Vorsterhauserweg 22d, Hamm, Westphalia, Germany
Original application Aug. 6, 1963, Ser. No. 300,208, now Patent No. 3,241,774, dated Mar. 22, 1966. Divided and this application May 21, 1965, Ser. No. 473,258
2 Claims. (Cl. 241—52)

ABSTRACT OF THE DISCLOSURE

An apparatus for comminuting plastic materials includes a grinding device which receives the material to be ground and a whirling current of gas in an amount of at least 30,000 parts by volume of the gas to one part by volume of the material, the grinding continuing for at most 1.2 seconds. A separator removes the gas and a sieving device rejects insufficiently ground material which may be transferred to a second grinding device for further treatment.

---

This application is a division of my copending application Ser. No. 300,208 filed Aug. 6, 1963, now Patent No. 3,241,774.

This invention relates to a method and means for comminuting thermoplastic materials. The invention is particularly concerned with a plant for the fine grinding and finest grinding of thermoplastic synthetic materials.

The use of thermoplastic synthetic materials is continuously increasing, with the result that the amount of refuse consisting of such materials and resulting from natural wear and tear as well as final deterioration in the hands of the ultimate user, becomes greater and greater. Modern plants have a refuse amounting to many tons per month, while the garbage of large cities contains sometimes up to 2% of synthetic materials; this means that, for example, in a city of one million inhabitants a few thousand tons of synthetic materials appear as waste per year. Furthermore, considerable amounts of waste of syntheic materials appear continuously during the production of plastic parts in vacuum deep drawing and pressing processes, since all forms and machines produce defective and discarded parts.

Due to the availability of all these large quantities the question arose of the industrial utilization of this refuse. The problem was of particular interest in the case of polyvinyl chlorides (short term "PVC") due to extensive possibilities of their use. These substances have, however, the drawback that once they have been hardened, and after they have been supplied with the necessary softeners in a ground or broken up state, they will produce only soft articles suitable, for example, as floor coverings. On the other hand, the technical demand is for highly valuable articles of so-called hard quality.

There is the theoretical possibility of continuing with great exertion the physical comminution of refuse consisting of these plastic materials to a point wherein certain procedures can be applied to produce again articles of hard quality, such as hard "PVC," for example. However, the grinding must be carried out in that case in cooled aggregates and so far, all such materials were entirely uneconomical. The cooling during grinding was necessary since these substances become thermoplastic within the temperature range of between 60° C. and 80° C.; as the result they coated the interior of the grinders, brought the grinding to a standstill and thus required expenditures which were entirely uneconomical in view of the price of the final product and the expense of further necessary treatments.

An object of the present invention is the provision of means which would solve in a simple manner the problem of grinding these synthetic materials.

Other objects of the present invention will become apparent in the course of the following specification.

The present invention is based in part on the discovery that the thermoplastic properties of these synthetic materials do not become pronounced when the grinding continues no longer than one second, or a maximum of 1.2 seconds, and when at least 30,000 parts by volume of air or gas under atmospheric conditions are added to one part by volume of the product being ground during the grinding. It was also observed that there is a noticeable drop in output when the supply of air is increased to a ratio of 1:90,000 by volume.

The invention will appear more clearly from the following detailed description when taken in connection with the accompanying drawing the sole figure of which represents diagrammatically and partly in section an apparatus for comminuting thermoplastic materials in accordance with the present invention.

The drawing shows a grinding apparatus 1 having a vertical shaft and grinding plates 1a which are attached to the shaft and which move past a stator 1b provided with vertical ridges. The grinding plates and the ventilator 1c which is located above them, are arranged to provide for a supply of an extremely large amount of air.

The apparatus of the present invention is particularly novel and original in that heretofore the experiences and the teaching of the art of fine grinding were to the effect that large amounts of air have a detrimental result on the efficiency of the grinding and the possibility of obtaining finely comminuted ground particles.

On the other hand, actual practical experience with the apparatus of the present invention has shown that when operating continuously with three shifts per day it is possible to obtain a degree of comminution amounting to an upper particle limit of from 0.4 to 0.5 mm., whereby the material to be ground can be preliminarily broken up to a size of particles from 5 to 10 mm.

The grinding device 1 is supplied with the preliminarily broken up material through a supplying device 2 having a lock 3. The material is introduced into the device 2 in the direction of the arrow A. After grinding the comminuted material provided with a large supply of air leaves the grinding device 1 in the direction of the arrow B and enters a separator, such as a cyclone 4.

A single cyclone is sufficient for the usual operational requirements; it delivers suitable comminuted material in the direction of the arrow D. It is advisable to provide a sieving device 5 so as to avoid particles of excessive size, which may have detrimental effects during further treatment when they are larger in size than 0.5 mm.

The finished product leaves the apparatus in the direction of the arrow F and is then taken away for the forming by suitable chemical treatments.

The rejected particles unsuitable for further treatment leave the sieving device 5 in the direction of the arrows E and are returned to the supplying device 2 in the direction of the arrow A to be subjected again to the grinding.

Purified gas leaves the cyclone 4 in the direction of the arrow C.

The second grinding device 7 which may be incorporated into the installation, receives its material to be comminuted from the material rejected by the seiving device 5 which is connected to the cyclone 4. The material flows in the directions represented by the arrows E and enters the grinding device 7 in the direction of the arrow $E_1$. The grinding device 7 does not require a lock of the type of the lock 3, since it receives comparatively small amounts of the material. Exhaust gas leaves the grinding device 7 in the direction of the arrows H and again enters the cyclone 4.

It is possible to carry out the separation of the ground material from the gas in a separate cyclone or in a separate filtering apparatus.

When it is necessary that the quality of air discharged into the atmosphere be particularly high, the air leaving the cyclone 4 can be subsequently purified in a further filtering apparatus 6 such as a hose filter. The solid particles pass out of the filtering apparatus 6 in the direction of the arrow G and join the comminuted material leaving the apparatus in the direction of the arrow F.

Air is introduced into the grinding device of the installation in the direction of the arrrows K.

The grinding takes place in the manner described above, namely, by allowing the material to remain in the grinding device for not more than 1.2 seconds while whirling it with air in a proportion of between 30,000 and 90,000 parts of air by volume to 1 part of the material being ground.

The material is preferably preliminarily comminuted to a particle size of at most 10 millimicron, while the size of the final particles is at most 0.4 to 0.5 mm. Particles of a larger size are rejected by the sieving device 5 and may be returned by a suitable conduit to the material supplying device 2. On the other hand, the mixture of air and material ground by the second grinding device 7 enters the separator 4 jointly with mixture of air and material ground by the first grinding device 1. The filtering device 6 receives from the separator 4 a mixture of air (or other gas) and finely comminuted particles so that the finely comminuted particles can be transmitted directly to the outlet of the sieving device 5 wherein they are mixed with the other particles which have been passed by the sieving device 5.

The apparatus of the present invention makes it possible for the first time to solve in a simple and securely operable manner and with a higher degree of economic efficiency the problem of continuously increasing plastic residue and its further manufacture with a quality article. The described apparatus prevents the loss of large amounts of synthetic refuse to the economy; on the contrary, it makes it possible to use it for the manufacture of qualitatively high value products.

It is apparent that the example shown and described above, has been given solely by way of illustration and not by way of limitation and that it is subject to many variations and modifications within the scope of the present invention. All such variations and modifications are to be included within the scope of the present invention.

What is claimed is:
1. An apparatus for finely grinding thermoplastic synthetic materials, comprising a grinding device, means connected with said grinding device for supplying the thermoplastic material to be ground thereto, means connected with said grinding device for supplying thereto a whirling current of gas in a volume substantially greater than that of said material, a cyclone connected with said grinding device for separating the ground material from said gas, a sieving device connected with said cyclone for rejecting insufficiently ground material and returning it toward said grinding device while transmitting adequately ground material and a filtering device connected with said cyclone and said sieving device.

2. An apparatus for finely grinding thermoplastic synthetic materials, comprising a grinding device, means connected with said grinding device for supplying the material to be ground thereto, means connected with said grinding device for supplying thereto a whirling current of gas in a volume substantially greater than that of said material, a separator connected with said grinding device for separating the ground material from said gas, a sieving device connected with said separator for rejecting insufficiently ground material, a second grinding device connected with said sieving device and receiving said insufficiently ground material, means connecting said second grinding device with said separator for transmitting the material ground by said second grinding device to said separator, and a filtering device having an inlet connected with said separator and an outlet connected with the outlet of said sieving device.

References Cited

UNITED STATES PATENTS

| | | | |
|---|---|---|---|
| 2,194,026 | 3/1940 | Mandle | 241—52 X |
| 2,471,043 | 5/1949 | Schenck | 241—78 X |
| 2,609,150 | 9/1952 | Bludeau | 241—52 X |
| 2,877,953 | 3/1959 | Heritage | 241—78 X |
| 2,962,231 | 11/1960 | Weston | 241—80 X |
| 2,990,124 | 6/1961 | Cavanaugh | 241—52 X |
| 3,017,126 | 1/1962 | Converse | 241—78 X |
| 3,071,330 | 1/1963 | Jackering | 241—53 |
| 3,084,876 | 4/1963 | Podmore | 241—52 X |

FOREIGN PATENTS

| | | |
|---|---|---|
| 956,555 | 8/1949 | France. |
| 1,005,814 | 4/1957 | Germany. |

WILLIAM W. DYER, JR., *Primary Examiner.*

F. T. YOST, *Assistant Examiner.*